United States Patent
Mordvintsev

(10) Patent No.: US 9,940,551 B1
(45) Date of Patent: Apr. 10, 2018

(54) IMAGE GENERATION USING NEURAL NETWORKS

(71) Applicant: Google Inc., Mountain View, CA (US)

(72) Inventor: Alexander Mordvintsev, Zurich (CH)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/185,655

(22) Filed: Jun. 17, 2016

(51) Int. Cl.
*G06K 9/00* (2006.01)
*G06K 9/62* (2006.01)
*G06K 9/48* (2006.01)

(52) U.S. Cl.
CPC ............ *G06K 9/627* (2013.01); *G06K 9/482* (2013.01); *G06K 9/6257* (2013.01); *G06K 9/00* (2013.01); *G06K 2009/485* (2013.01)

(58) Field of Classification Search
CPC .... G06K 9/00288; G06K 9/00; G06K 9/6296; G06K 9/00268; G06K 9/00302; G06K 9/00744; G06K 9/00201; G06K 9/00275; G06K 2209/05; G06K 9/2018; G06K 9/62; G06K 9/0063; G06K 9/00651; G06K 9/6269; G06K 9/627; G06K 9/6277; G06K 9/00389; G06K 9/00664; G06K 2209/01; G06K 2209/015; G06K 9/00979; G06K 9/3241; G06K 9/38; G06K 9/4661; G06K 9/6264; G06K 9/629; H04N 2201/0084; H04N 13/0239; H04N 13/0278; H04N 13/0484; A61B 5/411; A61B 5/446; A61B 5/7267; A61B 5/7475; A61B 5/7246; A61B 5/726; A61B 5/742; A61B 5/0402; A61B 5/0476; A61B 5/0488; A61B 6/545; G06T 15/20; G06T 19/20; G06T 2200/04; G06T 2207/10032; G06T 2207/20084; G06T 2207/30181; G06T 19/00; G06T 1/0007;
(Continued)

(56) References Cited

U.S. PATENT DOCUMENTS

| | | | | |
|---|---|---|---|---|
| 5,048,097 A | * | 9/1991 | Gaborski | G06K 9/00 382/156 |
| 6,233,310 B1 | * | 5/2001 | Relihan | H05G 1/46 378/108 |

(Continued)

OTHER PUBLICATIONS

Nguyen et al., "Deep Neural Networks are Easily Fooled: High Confidence Predictions for Unrecognizable Images," arXiv:1412.1897v4 [cs.CV], Apr. 2, 2015, pp. 1-20.
(Continued)

*Primary Examiner* — Aklilu Woldemariam
(74) *Attorney, Agent, or Firm* — Fish & Richardson P.C.

(57) ABSTRACT

Methods, systems, and apparatus, including computer programs encoded on computer storage media, for image generation using neural networks. In one of the methods, an initial image is received. Data defining an objective function is received, and the objective function is dependent on processing of a neural network trained to identify features of an image. The initial image is modified to generate a modified image by iteratively performing the following: a current version of the initial image is processed using the neural network to generate a current objective score for the current version of the initial image using the objective function; and the current version of the initial image is modified to increase the current objective score by enhancing a feature detected by the processing.

18 Claims, 8 Drawing Sheets

(58) Field of Classification Search
CPC . G06T 2207/20012; G06T 5/007; G06T 5/50; G06T 7/11; G06N 3/084; G06N 7/005; G06N 3/04; G06N 3/08; G06N 3/049; G06N 3/02; G06N 3/10; G06N 3/063; G06N 3/0635; G06N 3/086; G06N 3/0454; G06F 3/016; G06F 3/011; G06F 3/013; G06F 11/0706; G06F 11/0751; G06F 11/079; G06F 11/0793; G06F 17/30312; G06F 8/355; H04L 67/125; H04L 67/18; H04M 1/72583
USPC ....... 382/118, 152, 190, 100, 165, 254, 156, 382/178, 310; 345/419, 440, 630
See application file for complete search history.

(56) References Cited

U.S. PATENT DOCUMENTS

| | | | | |
|---|---|---|---|---|
| 6,738,494 | B1* | 5/2004 | Savakis | G06K 9/00234 382/100 |
| 9,501,829 | B2* | 11/2016 | Carlton | G06F 19/321 |
| 9,704,068 | B2* | 7/2017 | Mnih | G06K 9/6269 |
| 2004/0122790 | A1* | 6/2004 | Walker | G06F 19/321 |
| 2004/0186815 | A1* | 9/2004 | Stockfisch | G06N 3/08 706/16 |
| 2011/0075917 | A1* | 3/2011 | Cerosaletti | G06K 9/036 382/159 |
| 2014/0079297 | A1* | 3/2014 | Tadayon | G06K 9/00 382/118 |
| 2014/0201126 | A1* | 7/2014 | Zadeh | G06K 9/627 706/52 |
| 2015/0066496 | A1* | 3/2015 | Deoras | G10L 15/16 704/232 |
| 2015/0178554 | A1* | 6/2015 | Kanaujia | G06T 19/20 382/118 |
| 2015/0293976 | A1* | 10/2015 | Guo | G06F 17/30554 707/706 |
| 2016/0026253 | A1* | 1/2016 | Bradski | G02B 27/225 345/8 |
| 2016/0188997 | A1* | 6/2016 | Desnoyer | G06K 9/00744 382/190 |
| 2016/0379132 | A1* | 12/2016 | Jin | G06N 99/005 706/12 |
| 2017/0083752 | A1* | 3/2017 | Saberian | G06T 3/40 |

OTHER PUBLICATIONS

Ruder et al., "Artistic style transfer for videos," arXiv:1604.08610v1 [cs.CV], Apr. 28, 2016, pp. 1-14.
Szegedy et al., "Going deeper with convolutions," arXiv:1409.4842v1 [cs.CV], Sep. 17, 2014, pp. 1-12.

* cited by examiner

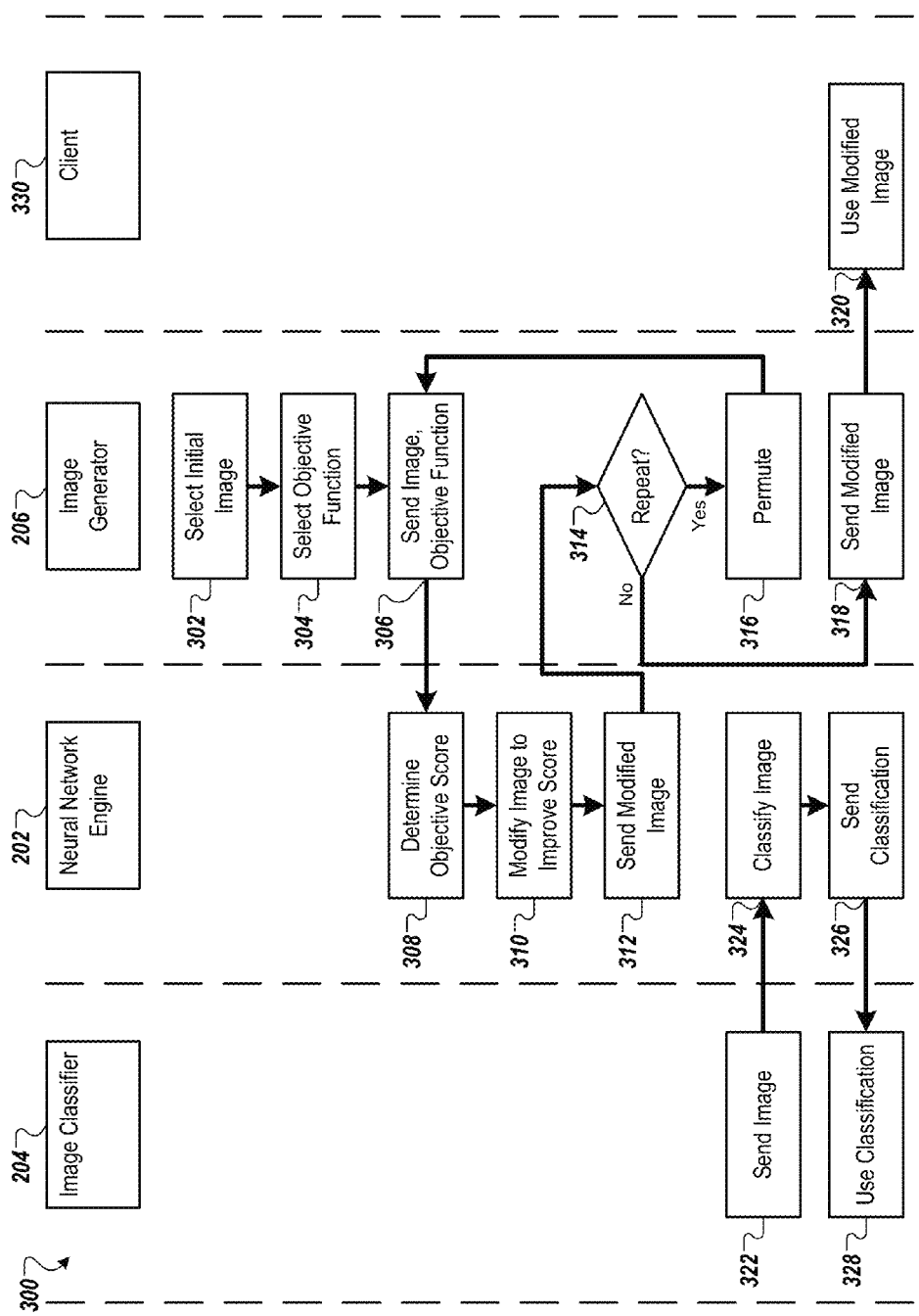

IMAGE GENERATION USING NEURAL NETWORKS

BACKGROUND

The present document relates to neural networks implemented by one or more computers.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on classification tasks and used to classify neural network inputs into a number of categories.

SUMMARY

A system can use a neural network to generate images. For example, a neural network may be trained to classify images based on feature recognition. That neural network may further be configured to identify and enhance the features that are recognized. An image may be repeatedly processed by this neural network, thereby being iteratively modified to create a new image.

In general, one innovative aspect of the subject matter described in this specification can be embodied in methods, computer-readable mediums, and systems that include receiving an initial image; receiving data defining an objective function that is dependent on processing of a neural network trained to identify features of an image; and modifying the initial image to generate a modified image by iteratively performing the following: processing a current version of the initial image using the neural network to generate a current objective score for the current version of the initial image using the objective function; and modifying the current version of the initial image to increase the current objective score by enhancing a feature detected by the processing.

Implementations can include any, all, or none of the following features. Modifying the initial image to generate the modified image by iteratively performing the following further comprises permuting the current version of the initial image. Permuting the current version of the initial image comprises jittering the current version of the initial image. Permuting the current version of the initial image comprises resizing the current version of the initial image. Modifying the current version of the initial image to increase the current objective score comprises performing an iteration of gradient descent against the current version of the initial image. Performing an iteration of gradient descent against the current version of the initial image comprises backpropagation the current version of the initial image through a plurality of layers of the neural network to determine an adjustment to the current version of the initial image. The neural network is organized into a series of layers, and wherein the objective function has term associated with one of the series of layers. The neural network is organized into a plurality of neurons, and wherein the objective function has term associated with fewer than all of the plurality of neurons. Processing a current version of the initial image using the neural network to generate a current objective score for the current version of the initial image using the objective function comprises boosting gradient values in areas of low frequency.

The systems and processes described here may be used to provide a number of potential advantages. Aesthetically pleasing images may be generated with little or no human input. These images may be created from an initial image from any source, including existing images selected for their aesthetic components. Images may be created from random or pseudorandom noise, allowing for the creations of diverse images.

Other features, aspects and potential advantages will be apparent from the accompanying description and figures.

DESCRIPTION OF DRAWINGS

FIG. 3A is a swim-lane diagram of an example process for generating images.

Like reference symbols in the various drawings indicate like elements

DETAILED DESCRIPTION

A neural network, having been trained on a corpus of images for feature recognition, may be used by an image generator in order to generate new images by iteratively modifying an image to enhance detected features. For example, a random or pseudorandom image, optionally created with some constraints, may be generated and an objective function may be defined. The image generator may then provide the first version of that image and the objective function to the neural network.

A neural network engine has been configured to determine the result of the objective function for the original image, and to modify the image to increase the result of the objective function. The image generator may then make a new permutation of the image by, for example, resizing and/or jittering. The process may be repeated, starting with the permuted image, until a new image is produced.

Figure 1A:
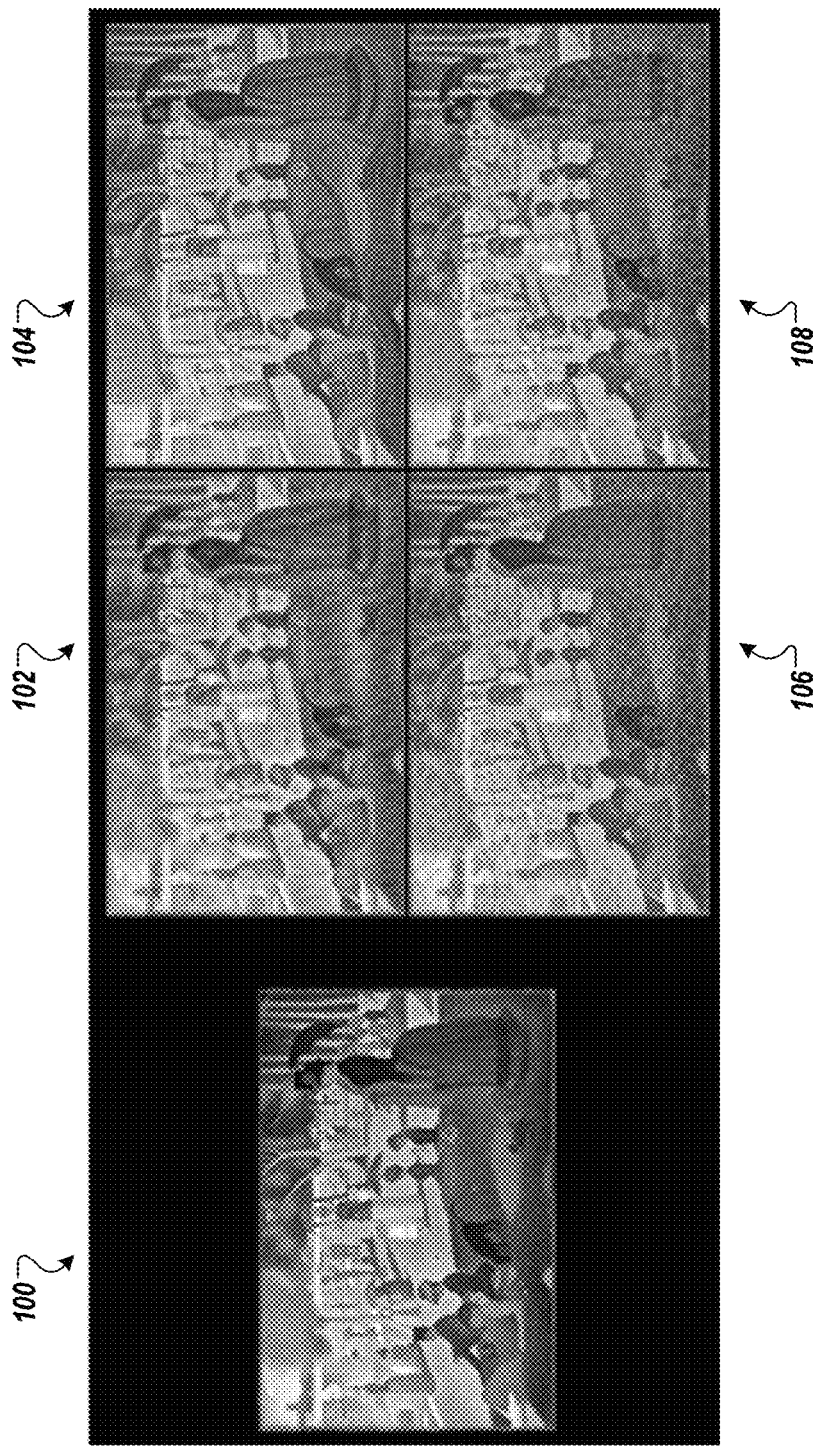
FIGS. 1A and 1B show images that may be generated by an image generation system.
Figure 1B:
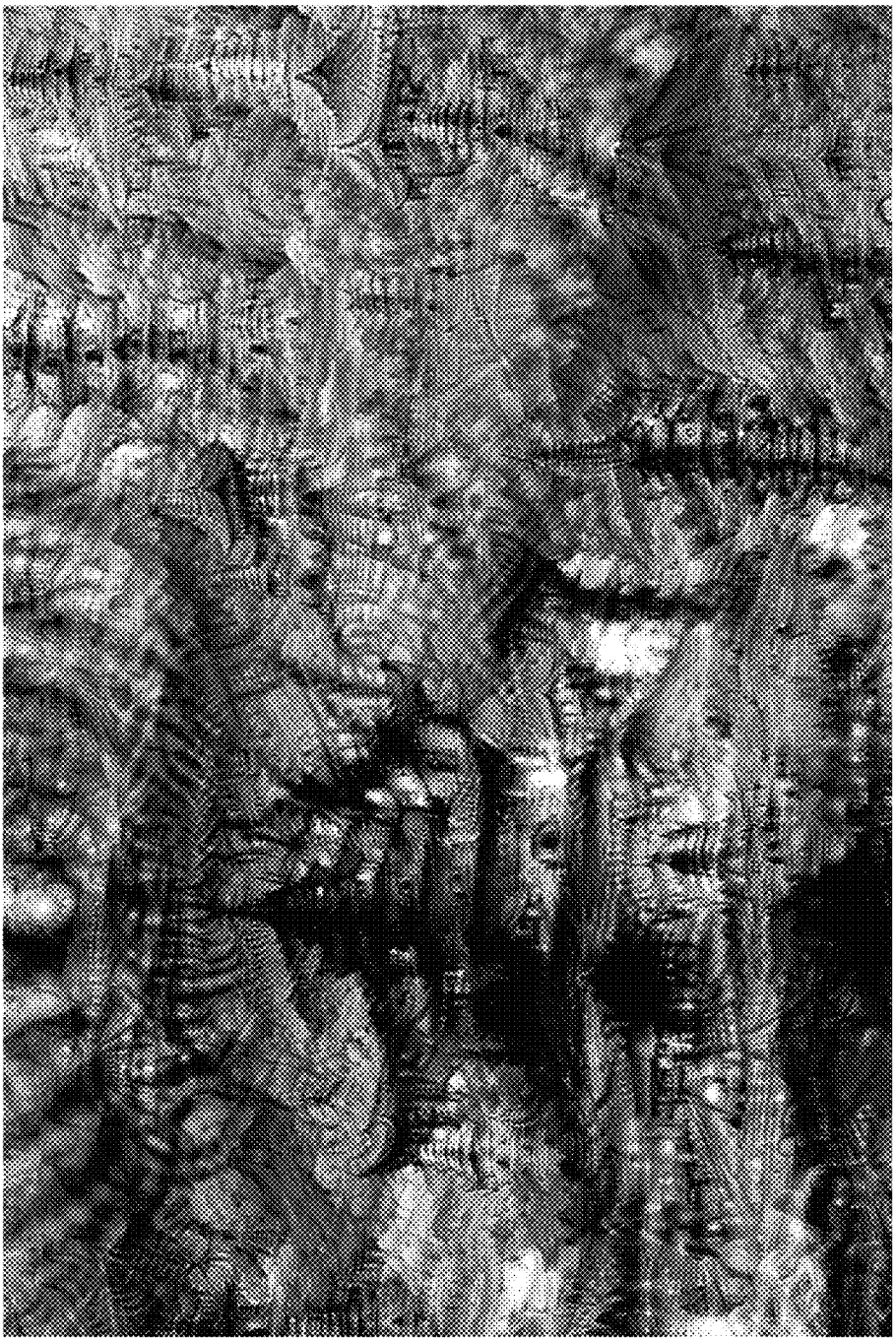

FIGS. 1A and 1B show images that may be generated by an image generation system. FIG. 1A shows an image 100 (*A Sunday Afternoon on the Island of La Grande Jatte* by Georges Seurat), and images 102-108 created from the image 100 with technology and techniques described in this document. Shown here are the effects of using different objective functions. That is, the images 102-108 are all created by the image generation system using the same initial image, image 100, and using the same or similar techniques, but with different objective functions. As will be described in more detail below, by using different objective functions, the image generation system can synthesize and/or enhance different features of the image 100, resulting in the different images 102-108.

FIG. 1B shows an image 110 created with technology and techniques described in this document from an image of constrained pseudorandom noise. Unlike the images shown in FIG. 1A, the image 110 is created by starting with constrained pseudo-random noise. By starting with an initial image containing noise instead of an initial set of features, the techniques described in this document can be used to synthesize and/or enhance new features into an original image.

Figure 2:
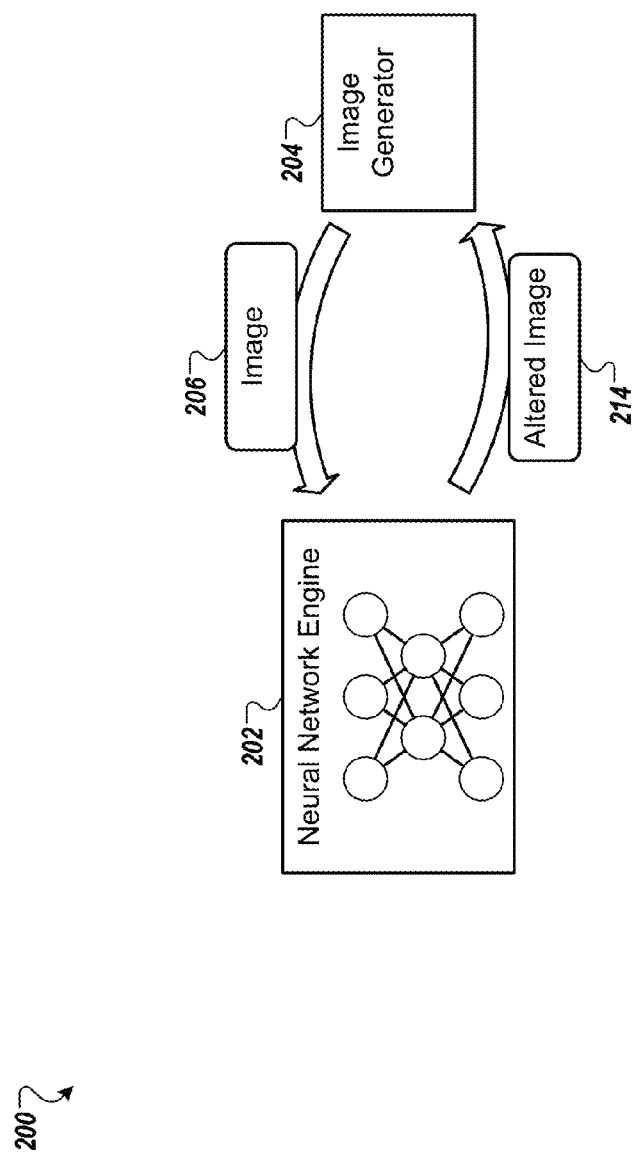
FIG. 2 is a block diagram of a system that may be used to generate images.

FIG. 2 is a block diagram of a system 200 that may be used to generate images. The system 200 is an example of a system implemented as computer programs on one or more computers in one or more locations, in which the systems, components, and techniques described below can be implemented.

The system 200 contains a neural network engine 202 and an image generator 204. In this example, the image generator 204 can send an image 206 to the neural network engine 202 and receive back an altered image 214.

The neural network engine 202 in this example includes a computer-implemented neural network. The neural network is often organized into neurons, which are grouped into layers. In this example, the artificial neural network has been trained on a corpus of images that have been previously categorized, for example by human input. In general, the neural network can identify features in images and generate correlations between those features and categories. This training allows the neural network engine 202 to be used for a number of possible tasks that involve, but are not limited to, classifying an image into categories and modifying images so that they more closely match a pre-trained feature. An example of neural network technology that may be used by the neural network engine 202 is described by Christian Szegedy et al. (2014). Going Deeper with Convolutions. CoRR, abs/1409.4842.

To support these tasks, the neural network engine 202 can include additional computational tools. For example, the neural network engine 202 may include tools such as category indexing in order to index and search categories, which may be used for image classification. Other tools can include, but are not limited to, tools for calculating an objective score from an objective function given a particular image; tools for performing gradient descent; and tools for editing an image.

The image generator 204 may provide an image 206 to the neural network engine 202. The neural network engine 202 may alter the image 206 and return the altered image 208 to the image generator. For example, the neural network engine 202 may process the image with the neural network and use the results of that processing to calculate an objective score from an objective function. The neural network engine 202 may then alter the image, for example by performing a gradient descent on the image (or data generated from the image) to alter the image in a way that increases the objective score. Conceptually, this process may be thought of as determining why the neurons on the neural network are activated when processing an image, and then modifying the image to bring out or add to the details that make the neurons activate.

In some cases, the neural network of the neural network engine 202 is configured in sequential layers of neurons. For convenience of description, these layers will be described as being arranged in a vertical stack. Other configurations are possible, however. For some tasks, one layer may be configured to be the input layer of the neural network, and another layer may be configured to be the output layer. For example, for image classification, the top layer may be configured as the input layer and the bottom layer may be configured as the output layer. Neurons in each layer may be configured to identify features at progressively coarser frequency. That is, neurons in higher levels may be configured to identify fine-grain features (akin to brush strokes) and neurons in lower levels may be configured to identify coarse-grain features (akin to objects created from brush strokes). For some other tasks such as image alteration described in this document, the same or a similar neural network may be used with a similar convention, where the image is provided to the same top layer as input and the bottom layer (or another layer) as an output layer. Backpropagation may then be used to edit the input image as part of generating the new image.

Although the neural network engine 202 is shown interacting with an image generator 204, other configurations are possible. For example, a neural network engine 202 may be configured to interact with image generator 204 and may also be configured to interact with other systems (e.g., an image classifier configured to send an image to the neural network engine and receive back classification data for the image).

FIG. 3A is a swim-lane diagram of an example process 300 for generating images. The process is described with reference to the elements of system 100 of FIG. 1. However, other components can be used to perform the process 300 and/or other similar processes.

The image generator 204 can select 302 an initial image. For example, the image generator 204 can receive an existing image that has been created from any technologically appropriate source. These sources can include, but are not limited to, photographs, paintings, video frames, and rendered images. See, for example, FIG. 1A. In some cases, the initial images may be synthesized specifically for use in the process 300. These synthesized images may be generated from random or pseudorandom noise (e.g., assigning values in color space according to random or pseudorandom numbers). For clarity, this example will be described with reference to a bitmap image where the image is composed of a two-dimensional array of pixels each having one or more color values (e.g., a value for red, blue and green channels, a value for cyan, magenta, yellow, and key channels, an alpha channel), but other formats of image may be used.

The synthesized image may be generated in compliance with one or more constraints. For example, a corpus of images may be examined to determine the distribution of correlations between neighboring pixels, the distribution of color values, the frequency of textures, or mathematical properties of detected edges. These rules may be used, optionally with alteration, as constraints on the creation of the synthesized initial images. This may result in, for example, synthesized initial images that have some properties that are similar to the images in the corpus of images.

The image generator 204 can select 304 an objective function for use in altering the selected image. For example, the image generator 204 may receive input from an external data source specifying an objective function, may present a user with an option to select or specify an objective function, or may generate an objective function using random, pseudorandom, or deterministic processes.

The objective function may include, as terms, measures from a neural network's processing of an image. By determining values of these terms for a given image, the objective function can be used to determine an objective score for an image. The objective score can generally be described as a measure of how well the processed image matches the test for a neuron or neurons of a neural network. For example, if an image is provided to the neural network engine 202, the neurons that are activated may be monitored. The activations and/or associated metadata may be used as terms.

Objective functions may be configured to target only a specific subset of the neuron in the neural network. For example, to target small brushstroke-like features, output generated by all of the nodes in a layer near the input layer of a neural network may be used as a source of terms of the objective function. In another example, to target large distinct features, output generated by a single neuron or small subset of the neurons in a layer near the output layer may be used as a source of terms for the objective function.

The image generator 204 can send 306 the current image and/or data defining the objective function to the neural network engine 202. In the first execution of this portion of the process 300, the current image is the initial image selected previously by the image generator 204. In subsequent executions of this portion of the process 300, the current image may be the current modified and permuted image generated by the neural network engine 202, as will be described below.

Additionally, the data defining the objective function may be sent 306 to the neural network engine 202. The data defining the objective function may be sent once, the first time the current image is sent, sent each time the current image is sent, or according to another technologically appropriate configuration. In some configurations, the objective function does not change during the execution of the process 300. In some configurations, the image generate 204 can change the objective function during the execution of the process 300. For example, a particular objective function may be used for a number of iterations, then a different objective function may be used for later iterations. Similarly, different objective functions may be used for different portions of an image (e.g., an image may be broken into four quadrants, with different objective functions for each quadrant).

Figure 3B:
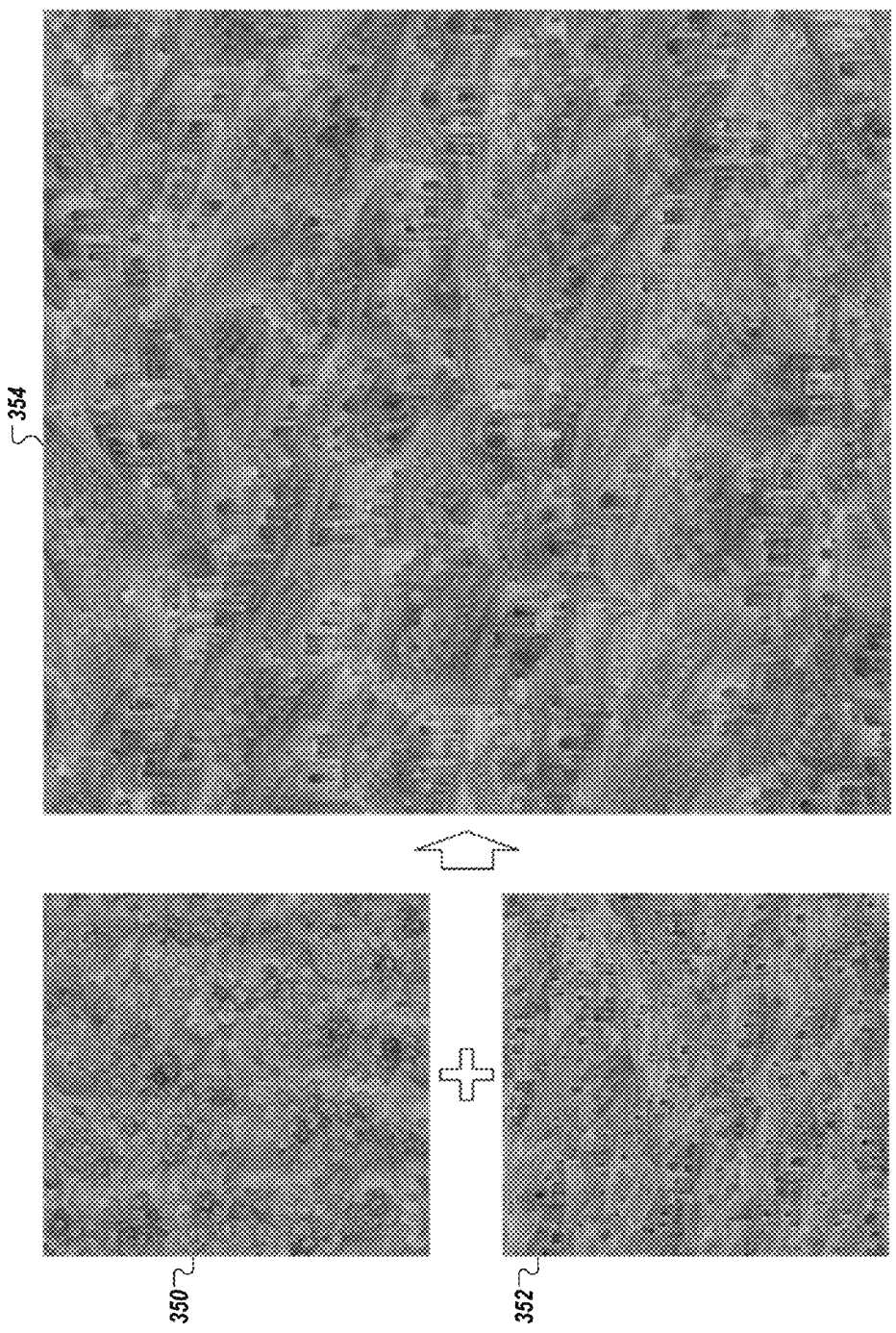
FIG. 3B shows an image that may be generated by an image generation system that changes objective functions.

FIG. 3B shows an example of an image created by changing objective functions. Image 350 is an image that can be generated using a first objective function for every iteration and image 352 is an image that can be generated using a second objective function for every iteration. Image 354 is an image that can be generated using the first objective function for some iterations and the second objective function for some iterations.

The neural network engine 202 receives the current image and determines 308 the objective score for the current image. For example, the neural network engine 202 can process the image with the neural network, recording data and metadata from the processing. In this example, the neural network engine 202 records output generated by the neurons of interest (i.e., the outputs on which the value of the objective function depends), and uses that output to calculate the objective score for the image with the objective function.

Pseudocode for two example objective functions are show here. In these examples, "mixed4C" and "mixed4d_3×3 bottleneck_pre_relu" are the names of layers for which feature channels are being maximized, and "[:,:,:,139]" and "[:,:,:,65] are slices of the layer arrays in the image (e.g., in the image 354, the layers correspond to the "flower" and "house in tree" features). The first example objective function finds the element-wise square of the output of the layer of interest. Pseudocode for this objective function is:
layer=graph.get_tensor_by_name('mixed4c'); objective=tf.square(layer)

The second example objective function is the summation of two other objective functions, which could each be element-wise squares of the outputs of layers of interest as above, or any other appropriate functions. Pseudocode for the second objective function is:
layer=graph.get_tensor_by_name('mixed4d_3×3 bottleneck_pre_relu'); objective=layer[:,:,:,139]+layer[:,:,:,65].

The neural network engine 202 modifies 310 the current image to improve the objective score. For example, the neural network engine 202 can make one or more modifications to the current images designed to improve the objective score. To do so, the neural network engine 202 can perform a gradient descent against a feature representation of the current image by backpropagation. Backpropagation is a process for training a neural network that can be used in conjunction with optimizations such as gradient descent. Backpropagation can be used to calculate a gradient of a loss function with respect to all the weights in the neural network. The gradient can be used by the optimization to, for example, update the weights in an attempt to increase the loss function. For example, the neural network engine 202 can calculate a partial derivative for a loss function over the internal activations of the neural network engine 202 when the current image is processed by the neural network engine 202.

In some implementations, the neural network engine 202 obtains or creates a feature representation of the current image. This feature representation may be a point in a multi-dimensional feature space, and the point may be an n-dimensional vector of numerical feature values that represent an object. The feature values may correspond to pixels of the current image.

The neural network engine 202 can perform the gradient descent by adjusting the position of the image representation of the current image. For example, the neural network engine 202 can find an arrangement of pixels that creates a new feature representation that is similar to the current feature representation but has a higher objective score when processed by the neural network engine 202. For example, deltas of the loss function may be multiplied by a learning rate and applied to the pixel values.

The neural network engine 202 may optimize the adjustment using constrained optimization techniques. For example, the neural network engine 202 may adjust the position of the feature representation within a predetermined prior in the feature space, e.g., a prior that represents feature representations of data samples with naturally observed statistics. In some cases, this constraint could be represented by a term in the objective function that represents how well the constraint is satisfied. In some cases, only an adjustment that meets the constraint may is used.

In other examples, other forms of modifications to the image may be used in addition to or in the alternative to gradient descent. For example, an image can be used to generate a parameterized model (e.g., with size, locations, and shapes groups of pixels having similar values) and stochastic modification may be applied to these parameters to make multiple images with minor changes each. The image with the highest objective score, or all images above a threshold, may be used.

The neural network engine 202 can send 312 the modified image to the image generator 204. Additionally, the neural network engine 202 may optionally send other data such as the objective score of the modified image, a difference map that records the difference between the received image and the modified image, a timestamp, a summary of the computing resources used, or other technologically appropriate data.

The image generator 204 can determine 314 if the process should be repeated with the modified image. If the process should be repeated, the image generator 204 can permute 316 the image. For example, if an image should be permuted a set number of times or until the objective score is above a threshold, the image generator 204 can permute 316 the received modified image. In general, permuting the image 204 may change the image in some way so that the next time it is processed by the neural network engine 202, the image may be modified in a different way. The permuting may be deterministic, random, pseudorandom, based on user input, and/or based on other data.

If the process should not be repeated, the image generator 204 can send 318 the modified image to a client 330 for use. For example, the client 330 may execute on the same computer hardware as the image generator 204 and/or the neural network 202. In some examples, the client 330 may execute on computer hardware that is physically remote from, and communicably coupled with, hardware that is executing the image generator 204 and/or the neural network 202. The client 330 may include, for example, image rendering and/or editing software, publishing software, a web server, or any other technologically appropriate systems.

In some cases, the neural network engine 202 may be used for other tasks. For example, the neural network engine 202 may be used for image classification, in which an image classifier sends 322 an image to the neural network engine 202. The neural network engine 202 can classify 324 the image by processing the image using the neural network and send 326 classification data to the image classifier 204 for use.

Figure 4:
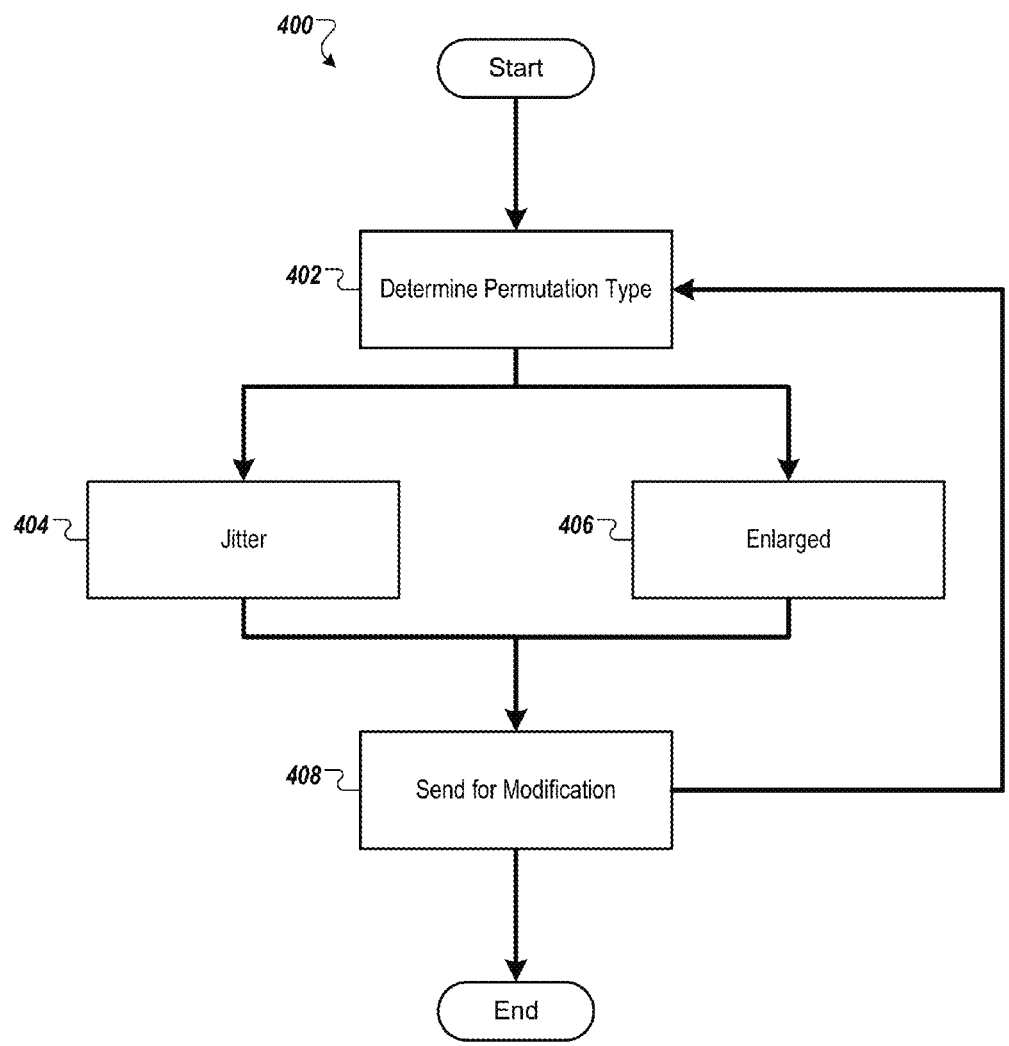
FIG. 4 is a flowchart of an example process for permuting an image.

FIG. 4 is a flowchart of an example process 400 for permuting an image. The process 400 may be used by, for example, the image generator 206 in selecting 302 and permuting 316 an image. However, other components can be used to perform the process 400 and/or other similar processes.

In this example, the image generator 206 is configured to perform an image generation process in which an image is synthesized, jittered, and enlarged. In particular, the image is jittered ten times, enlarged once, and then jittered ten times again. However, other schemes for permuting an image may be used.

The permutation type is determined 402. For example, the number of performed permutations may be determined, and the next permutation to be performed is determined. In this example, if there have been ten permutations, the image generator 204 can select enlarging as the next permutation. If there have been a different number of permutations, the image generator 204 can select jittering as the next permutation.

If selected, the image is jittered 404. For example, the image may be shifted in the horizontal and/or vertical direction. These shifts may be random, pseudorandom, or deterministic. In some cases, the distance to be shifted may be on the order of pixels. In some other cases, the distance to shift may be greater or less.

If selected, the image is enlarged 406. For example, the image size in the horizontal and vertical direction may be increased by an absolute (e.g., 100 pixels) or relative (e.g. 100%) size. To fill this additional space, the image contents may be enlarged by any technologically appropriate process, including but not limited to interpolations such as nearest-neighbor, bilinear, edge-detection, hqx, and supersampling.

The image is sent for modification 408. For example, the image generator 204 can send 306 the image to the neural network engine, resulting in a modified image returned to the image generator 204.

In some instances, it may be desirable to produce images that have lower frequency features. That is, produce images with fewer, larger features. One process of producing such a result includes adding smoothness constraints to the optimization function. Doing so can effectively blur the image every iteration, suppressing the higher frequencies and allowing lower frequencies to 'catch up.' Another way to produce such a result would be to boost lower frequencies instead.

To boost the lower frequencies, areas of different frequencies can be located by any appropriate process. Then, each area can be normalized independent of the other areas by editing the gradient for that area to have a standard deviation of a constant value (e.g., 1).

Figure 5:
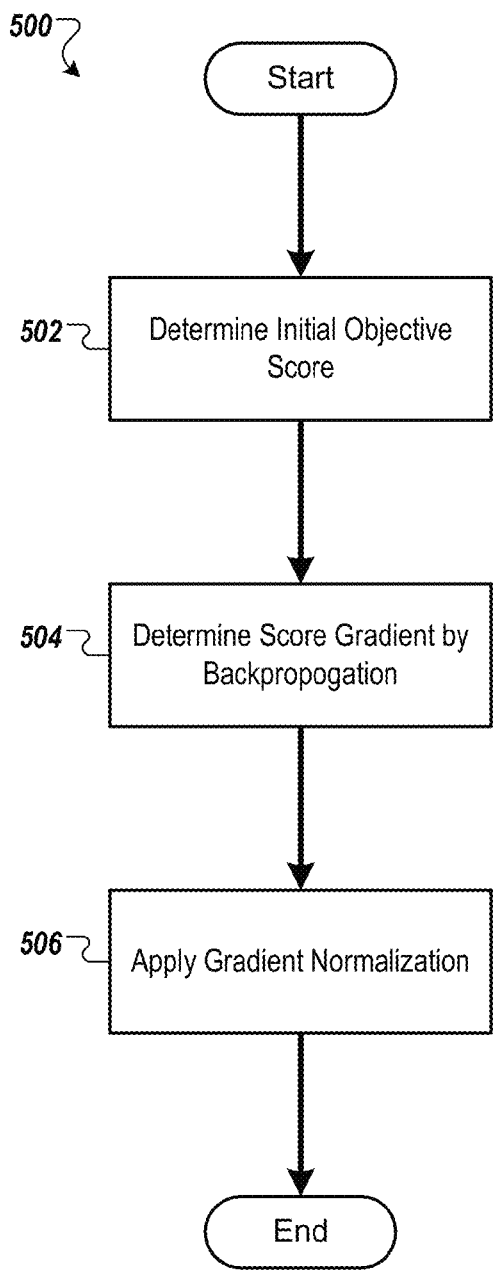
FIG. 5 is a flowchart of an example process for lowering the frequency of features of generated images.

FIG. 5 is a flowchart 500 of an example process for lowering the frequency of features of generated images. The process 500 may be used, for example, as part of determining an objective score 308 as described with reference to FIG. 3

An initial objective score is determined 502. As previously described, the score on an objective function can be found by using, as terms, measures from a neural network's processing of an image.

Score gradient is determined 504 by backpropagation. For example, a partial derivative can be found for a loss function over the pixel values of the image when a current image is processed.

Gradient normalization is applied 506. After the gradient is found, it may be normalized for different scales in the current image.

To separate the image into areas by frequency, the image can be decomposed by Laplacian pyramid decomposition. That is, an image is decomposed into a multiscale representation of the image. At each scale, a difference image is created. This difference image defines the difference between a particular scale representation and the next scale's representation. Therefore, when a difference image is combined with a corresponding multi-scale representation, the next-sized representation can be produced.

Where any particular difference image has values, the current image may thus be known to have a frequency that matches the scale of the particular difference image. This location information may then be used to identify everywhere in the current image that a particular frequency is found. With this location information, the gradients in the areas for each separate frequency can be normalized. For example, the gradients may have a distribution, and the gradients may be modified so that they have a standard distribution of a particular value (e.g., 1).

Applying this normalization separately within each frequency, the low-frequency areas can effectively be boosted when the current image is, for example, modified in 310 as described with reference to FIG. 3.

Other methods of identifying the areas of the current image by frequency are possible. For example, a copy of the current image could be convert to a spectral representation, and the image could be separated based on the spectral values.

Figure 6:
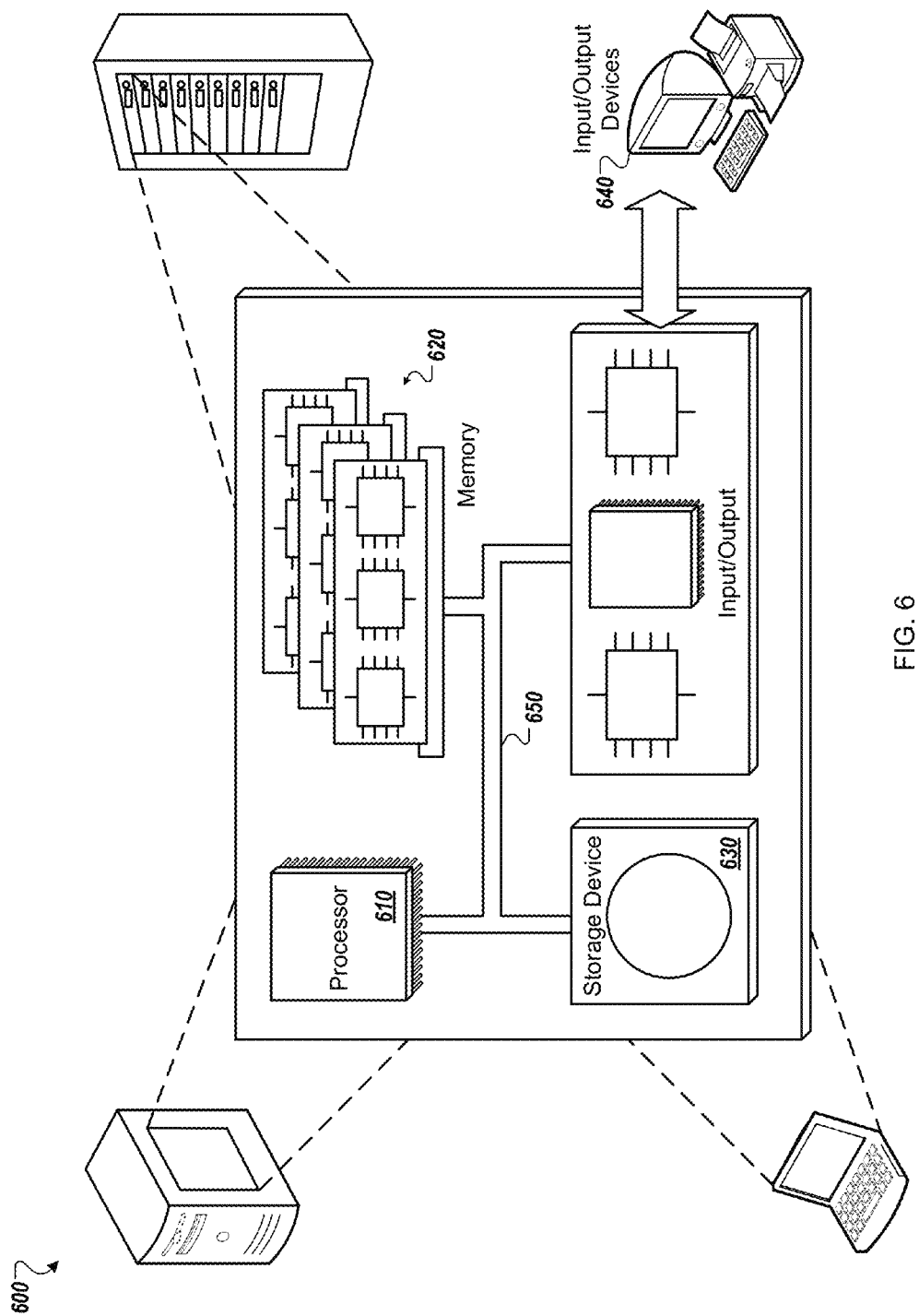
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method performed by data processing apparatuses, the method comprising:
    receiving an initial image;
    receiving data defining an objective function that is dependent on processing of a neural network trained to identify features of an image, wherein the neural network comprises a plurality of neurons, and wherein the objective function includes terms associated with outputs generated by a subset of the neurons of the neural network during processing of an input image by the neural network; and
    modifying the initial image to generate a modified image by iteratively performing the following:
        processing a current version of the initial image using the neural network to generate a current objective score for the current version of the initial image using the objective function, wherein the objective score is calculated based on the outputs generated by the subset of the neurons of the neural network during processing of the input image by the neural network; and
        modifying the current version of the initial image to increase the current objective score by performing an iteration of gradient descent against the current version of the initial image to enhance a feature detected by the processing, wherein performing the iteration of gradient descent comprises backpropagating gradients through a plurality of layers of the neural network to determine an adjustment to the current version of the initial image.

2. The method of claim 1, wherein modifying the initial image to generate the modified image by iteratively performing the following further comprises permuting the current version of the initial image.

3. The method of claim 2, wherein permuting the current version of the initial image comprises jittering the current version of the initial image.

4. The method of claim 2, wherein permuting the current version of the initial image comprises resizing the current version of the initial image.

5. The method of claim 1, wherein the neural network is organized into a series of layers, and wherein the objective function has term associated with one of the series of layers.

6. The method of claim 1, wherein processing a current version of the initial image using the neural network to generate a current objective score for the current version of the initial image using the objective function comprises:
   boosting gradient values in areas of low frequency.

7. A non-transitory, computer-readable medium storing instructions operable when executed to cause at least one processor to perform operations comprising:
   receiving an initial image;
   receiving data defining an objective function that is dependent on processing of a neural network trained to identify features of an image, wherein the neural network comprises a plurality of neurons, and wherein the objective function includes terms associated with outputs generated by a subset of the neurons of the neural network during processing of an input image by the neural network; and
   modifying the initial image to generate a modified image by iteratively performing the following:
      processing a current version of the initial image using the neural network to generate a current objective score for the current version of the initial image using the objective function, wherein the objective score is calculated based on the outputs generated by the subset of the neurons of the neural network during processing of the input image by the neural network; and
      modifying the current version of the initial image to increase the current objective score by performing an iteration of gradient descent against the current version of the initial image to enhance a feature detected by the processing, wherein performing the iteration of gradient descent comprises backpropagating gradients through a plurality of layers of the neural network to determine an adjustment to the current version of the initial image.

8. The medium of claim 7, wherein modifying the initial image to generate the modified image by iteratively performing the following further comprises permuting the current version of the initial image.

9. The medium of claim 8, wherein permuting the current version of the initial image comprises jittering the current version of the initial image.

10. The medium of claim 8, wherein permuting the current version of the initial image comprises jittering the current version of the initial image.

11. The medium of claim 7, wherein the neural network is organized into a series of layers, and wherein the objective function has term associated with one of the series of layers.

12. The medium of claim 7, wherein processing a current version of the initial image using the neural network to generate a current objective score for the current version of the initial image using the objective function comprises:
   boosting gradient values in areas of low frequency.

13. A system comprising:
   one or more processors configured to execute computer program instructions; and
   memory encoded with computer program instructions that, when executed by one or more processors, cause a computer device to perform operations comprising:
      receiving an initial image;
      receiving data defining an objective function that is dependent on processing of a neural network trained to identify features of an image, wherein the neural network comprises a plurality of neurons, and wherein the objective function includes terms associated with outputs generated by a subset of the neurons of the neural network during processing of an input image by the neural network; and
      modifying the initial image to generate a modified image by iteratively performing the following:
         processing a current version of the initial image using the neural network to generate a current objective score for the current version of the initial image using the objective function, wherein the objective score is calculated based on the outputs generated by the subset of the neurons of the neural network during processing of the input image by the neural network; and
         modifying the current version of the initial image to increase the current objective score by performing an iteration of gradient descent against the current version of the initial image to enhance a feature detected by the processing, wherein performing the iteration of gradient descent comprises backpropagating gradients through a plurality of layers of the neural network to determine an adjustment to the current version of the initial image.

14. The system of claim 13, wherein modifying the initial image to generate the modified image by iteratively performing the following further comprises permuting the current version of the initial image.

15. The system of claim 14, wherein permuting the current version of the initial image comprises jittering the current version of the initial image.

16. The system of claim 14, wherein permuting the current version of the initial image comprises jittering the current version of the initial image.

17. The system of claim 13, wherein the neural network is organized into a series of layers, and wherein the objective function has term associated with one of the series of layers.

18. The system of claim 13, wherein processing a current version of the initial image using the neural network to generate a current objective score for the current version of the initial image using the objective function comprises:
   boosting gradient values in areas of low frequency.

* * * * *